United States Patent [19]

Kohori

[11] 4,092,885
[45] June 6, 1978

[54] CENTER FOR LATHES

[76] Inventor: Kiyotaka Kohori, 40-4 3-chome, Aoyamadai, Suita, Osaka, Japan

[21] Appl. No.: 803,857

[22] Filed: Jun. 6, 1977

[30] Foreign Application Priority Data

Jun. 9, 1976 Japan .................................. 51-68115

[51] Int. Cl.² .......................................... B23B 23/04
[52] U.S. Cl. .................................................. 82/33 R
[58] Field of Search ...................... 82/33 R; 184/6.14

[56] References Cited

U.S. PATENT DOCUMENTS

| | | | |
|---|---|---|---|
| 1,782,272 | 11/1930 | Power | 82/33 R |
| 1,967,004 | 7/1934 | Braden | 82/33 R |

FOREIGN PATENT DOCUMENTS 1,098,075   3/1955   France .................................. 82/33 R

*Primary Examiner*—Leonidas Vlachos
*Attorney, Agent, or Firm*—George B. Oujevolk

[57] ABSTRACT

A center for lathes comprises a tubular casing with its interior serving as an oil chamber, a center rod fitting in the casing and having a conical front end projecting from the casing, front bearings and a rear bearing provided between the casing and the center rod, an oil feeding screw portion positioned between the front bearings and the rear bearing and formed on the center rod, and an oil reservoir provided on the casing. Forward and return oil channels extend between the oil reservoir and the oil chamber to permit the whole oil in the reservoir and the chamber to circulate within the center.

11 Claims, 3 Drawing Figures

CENTER FOR LATHES

BACKGROUND OF THE INVENTION

This invention relates to a center for lathes, and more particularly to a rolling center therefor.

Grease has heretofore been used for lubricating the bearing on rolling centers. However, when the center rod rotates at a high speed of more than 5000 r.p.m. along with the workpiece, the grease, because it is semi-solid, is unable to follow the rotation of the center rod, namely of the bearing, thus failing to fully wet the surfaces of the rolling elements of the bearing and to lubricate the bearing as desired.

SUMMARY OF THE INVENTION

This invention has overcome the above problem and provides a center comprising a tubular casing with its interior serving as an oil chamber, a center rod fitting in the casing and having a conical front end projecting from the casing, front bearings and a rear bearing provided between the casing and the center rod, an oil feeding screw portion positioned between the front bearings and the rear bearing and formed on the center rod, and an oil reservoir provided on the casing, forward and return oil channels extending between the oil reservoir and the oil chamber to permit the whole oil in the reservoir and the chamber to circulate within the center, whereby the bearings can be held immersed in the lubricant at all times free of any depletion thereof. Moreover, the rotation of the center rod which circulates the lubricant serves to inhibit the degradation of the lubricant.

This invention will be described below in greater detail with reference to the accompanying drawings.

DESCRIPTION OF THE PREFERRED EMBODIMENTS

Figure 1:
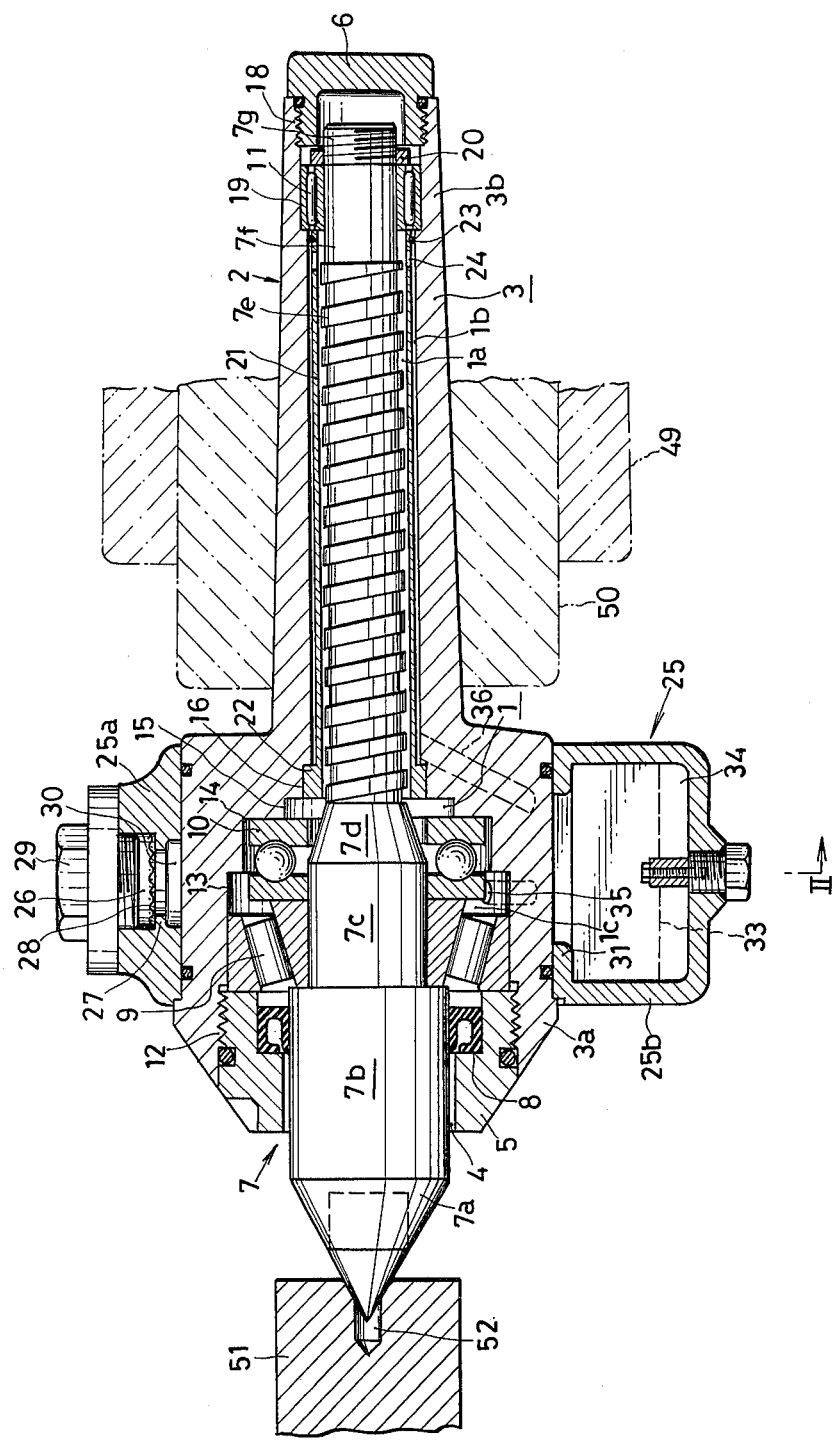
FIG. 1 is a view in longitudinal section showing a specific embodiment of the center of this invention for lathes.
Figure 2:
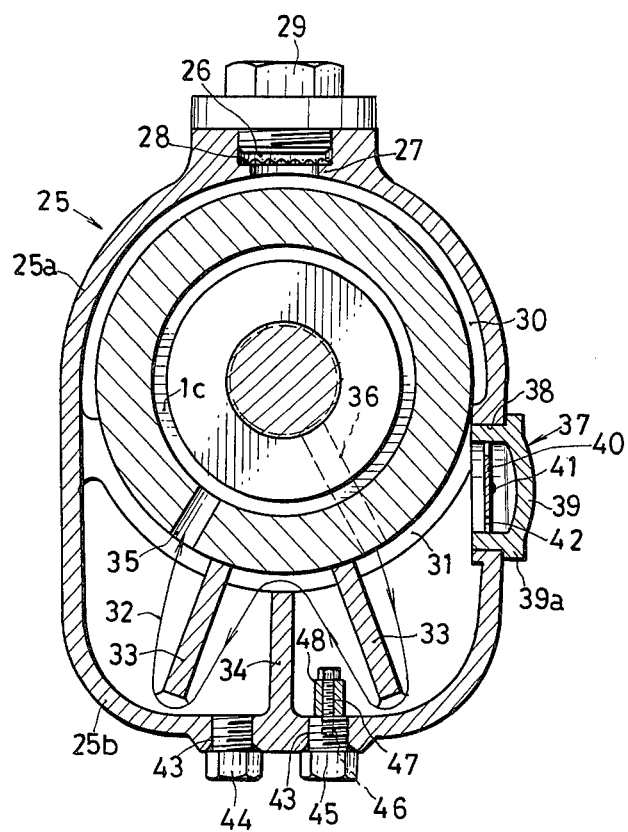
FIG. 2 is a view in section taken along the line II—II in FIG. 1.

With reference to FIGS. 1 and 2, a rolling center for lathes includes a tubular casing 2 with its interior serving as an oil chamber 1. The casing 2 comprises a tubular main body 3 including a large diameter portion 3a and a small diameter portion 3b extending rearward therefrom, a front cover 5 fixedly screwed into the front end of the large diameter portion 3a and having a bore 4 extending centrally therethrough and a rear cover 6 screwed into and secured to the rear end of the small diameter portion 3b. The casing 2 has a center rod 7 fitting therein and having a conical portion 7a projecting from the casing. The front end of the portion 7a is made of cemented carbide alloy. The center rod 7 further includes a first solid cylindrical front portion 7b, a second solid cylindrical front portion 7c having a smaller diameter than the portion 7b, a tapered portion 7d, an oil feeding screw portion 7e, a solid cylindrical rear portion 7f and an externally threaded portion 7g. These portions are provided in the order mentioned as continuously extending rearward from the conical front end 7a. An oil seal 8 fitting in the front cover 5 is in contact with the first cylindrical portion 7b extending through the bore 4 of the front cover 5. Front bearings 9 and 10 and a rear bearing 11 are provided between the casing 2 and the center rod 7. The large diameter portion 3a is internally formed with an internally threaded front end portion 12 which is continuous with first to fourth circular stepped portions 13 to 16 each having a progressively reducing diameter rearward. The first stepped portion 13 and the second stepped portion 14 respectively accommodate the front bearings 9 and 10, namely the combination of a radial bearing and a thrust bearing, to support the second cylindrical portion 7c. The small diameter portion 3b is internally formed with an internally threaded rear portion 18 and a stepped portion 19 positioned to the front of the threaded portion 18 and continuous therewith. The stepped porton 19 accommodates the rear bearing 11, i.e. a radial bearing, to support the cylindrical rear portion 7f. An annular nut 20 screwed on the threaded portion 7g bears against the rear end of the bearing 11. A partition tube 21 dividing the oil chamber 1 into an inner rear chamber 1a and an outer rear chamber 1b is provided between the oil feeding screw portion 7e and the casing 2 and is coextensive with the screw portion 7e. The partition tube 21 has at its front end a flange 22 fitting in the fourth stepped portion 16. An O-ring 23 is provided between the casing 1 and the partition tube 21. The partition tube 21 is formed at its rear end with a plurality of ports 24 arranged at a specified spacing circumferentially thereof and maintaining the outer chamber 1b in communication with the inner chamber 1a. The oil chamber 1 further includes a front chamber 1c positioned to the front of the inner chamber 1a and outer chamber 1b and accommodating the front bearings 9 and 10. The front chamber 1c is in communication with the inner rear chamber 1a.

An annular oil reservoir 25 fits around the large diameter portion 3a of the casing main body 3 and is oiltightly secured to the large diameter portion 3a by unillustrated screws. The oil reservoir 25 includes a semicircular fitting portion 25a extending along the upper half of the large diameter portion 3a and a U-shaped oil container portion 25b integral with the fitting portion 25a and positioned beneath the lower half of the large diameter portion 3a. The oil reservoir 25 has at its upper end an oil supply inlet 26. The oil supply inlet 26 is provided therein with an annular inner flange 27 supporting thereon a circular filter 28 made of metal screen for removing extraneous solids from the lubricant to be supplied. A closure 29 in the form of a flanged bolt is screwed into the oil inlet 26. The fitting portion 25a is formed in its inside wall with an oil groove 30 communicating with the oil inlet 26 and extending along the upper half of the large diameter portion 3a. The oil container portion 25b has, at its upper end, front and rear inner projections 31 extending along the lower half of the large diameter portion 3a. A plurality of partition walls 33 and 34 are disposed in staggered arrangement within the oil container portion 25b to form a zigzag path 32 of flow of oil for uniformly passing the lubricant contained therein. More specifically, a vertical lower partition wall 34 at the center of the container portion 25b has an upper end in contact with the bottom of the inner projection 31, forming a clearance between the upper end and the large diameter portion 3a. On the opposite sides of the lower partition wall 34, two slanting upper partition walls 33 are provided, with a clearance formed between the bottom wall of the container portion 25b and each of the walls 33. The large diameter portion 3a has a forward oil channel 35 maintaining the front oil chamber 1c in communication with the oil reservoir 25 at one end of the zigzag path 32, and a return oil channel 36 maintaining the outer oil chamber 1b in communication with the oil reservoir 25 at the other end of the zigzag path 32. The oil container portion 25b is provided with an oil gauge 37 at a specified portion of its side wall. The oil gauge 37 comprises a cap-shaped transparent member 39 of synthetic resin intimately fitting in an opening 38 in the side wall, and a colored disk 40 fixedly fitting in the transparent member 39. The transparent member 39 has a flange 39a serving as a stopper when the member 39 is fitted into the opening 38. The disk 40 is marked with a horizontal line 41 extending through its center. A pair of holes 42 are formed on the upper and lower sides of the horizontal line 41. The oil level within the transparent member 39, if positioned lower than the horizontal line 41, indicates that the amount of oil within the reservoir 25 is smaller than is required. The bottom wall of the container portion 25b is formed with two oil draining bores 43 on the opposite sides of the lower partition wall 34 respectively. The bores 43 are closed with plugs 44 and 45 respectively. The plug 44 is a bolt, while the bores 43 are each in the form of a threaded bore. The plug 45 positioned closer toward the return oil channel 36 has a threaded bore 46, and a small screw 47 screwed at its lower end in the bore 46 projects into the container portion 25b. A hollow cylindrical magnet 48 fitting around the screw 47 attracts iron particles or the like contained in the lubricant within the reservoir 25 to clean the oil. When the center rod 7 is driven reversely, producing a reverse flow of oil along the zigzag path 32, the plug 44 and the plug 45 are interchanged.

The center of this invention is supported by a tail stock 49 with the small diameter portion 3b of the tubular main body 3 of the casing 2 fitted in the hollow portion of the tail spindle 50 on the tail stock 49. The end of the conical portion 7a of the center rod 7 is inserted into a center cavity 52 in a workpiece 51 whose front end is held by the chuck of a lathe (not shown), whereby the rear end of the workpiece 51 is supported by the center. The lathe is driven in this state, rotating the workpiece 51, which also rotates the center rod 7. With the rotation of the center rod 7, the lubricant in the front chamber 1c and the inner rear chamber 1a of the oil chamber is forced rearward by the oil feeding screw portion 7e and then prevented by the rear cover 6 from further movement, whereupon the lubricant invariably flows into the outer oil chamber 1b through the ports 24 in the rear end of the partition tube 21. The lubricant flows forward through the chamber 1b into the oil container 25b of the reservoir 25 by way of the return oil channel 36. The lubricant flowing into the container portion 25b further flows in a zigzag fashion along the path 32 defined by the upper and lower partition walls 33 and 34 free of any stagnation within the container portion 25b. The lubricant thereafter flows through the forward oil channel 35 into the front oil chamber 1c. In this way, the lubricant uniformly flows through the oil reservoir 25 and the entire oil chamber 1 without the aid of any particular circulating means. This serves to inhibit the degradation of the lubricant, while the bearings 9, 10 and 11 are cooled with the lubricant, operating free of any depletion of oil. The lubricant remaining in the oil groove 30 in the fitting portion 25a of the oil reservoir 25 cools the large diameter portion 3a of the tubular main body 3 of the casing 2 from outside.

Figure 3:
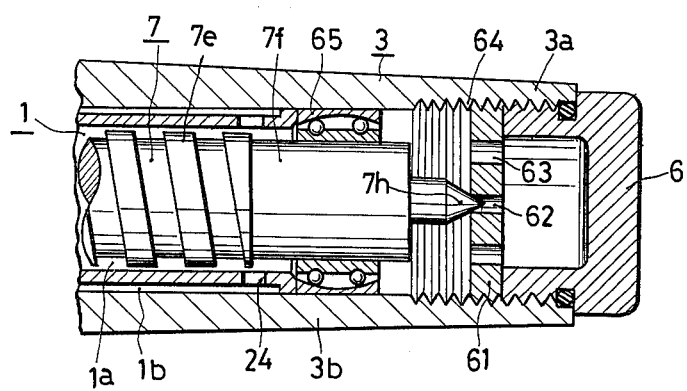
FIG. 3 is a fragmentary enlarged view in section showing another embodiment of this invention.

FIG. 3 shows another embodiment of the center according to this invention which incorporates special means for preventing the deflection of the center rod. It is noted that some clearance is invariably present between the casing, bearing and center rod. Accordingly, the center rod will slightly deflect when rotating at a high speed. To prevent such deflection, the center rod 7 has a conical portion 7h projecting rearward from its rear end and inserted into a central bore 62 formed in a deflection preventing plate 61. The plate 61 is secured to an inside rear end portion of the tubular main body 3 of the casing 2. The plate 61 is in the form of a disk externally threaded over its periphery and haivng a pair of holes 63, for a screw driver, positioned symmetrically with respect to the central bore 62. The small diameter portion 3b of the tubular main body 3 has an internally threaded end portion 64 which is axially longer than like portion 18 of the embodiment shown in FIG. 1. The deflection preventing plate 61 is positioned to the front of the rear cover 6 and is fixedly screwed in the threaded portion 64. A self-aligning bearing 65 is used as the rear bearing.

This invention may be embodied differently without departing from the spirit and basic features of the invention. Accordingly the embodiments herein disclosed are given for illustrative purposes only and are not in any way limitative. It is to be understood that the scope of this invention is defined by the appended claims rather than by the specification and that various alterations and modifications within the definition and scope of the claims are included in the claims.

What is claimed is:

1. A center for lathes comprising a tubular casing with its interior serving as an oil chamber, a center rod fitting in the casing and having a conical front end projecting from the casing, front bearings and a rear bearing provided between the casing and the center rod, an oil feeding screw portion positioned between the front bearings and the rear bearing and formed on the center rod, and an oil reservoir provided on the casing, forward and return oil channels extending between the oil reservoir and the oil chamber to permit the whole oil in the reservoir and the chamber to circulate within the center.

2. A center as defined in claim 1 wherein the casing comprises a tubular main body including a large diameter portion and a small diameter portion extending rearward therefrom, a front cover fixedly screwed into the front end of the large diameter portion and having a bore extending centrally therethrough, and a rear cover screwed into and secured to the rear end of the small diameter portion.

3. A center as defined in claim 1 wherein the center rod has a conical portion projecting rearward from its rear end and inserted into a central bore formed in a deflection preventing plate, the plate being secured to an inside rear end portion of the casing main body.

4. A center as defined in claim 1 wherein the oil reservoir is annular and includes a semicircular fitting portion extending along the upper half of the large diameter portion and a U-shaped oil container portion integral with the fitting portion and positioned beneath the lower half of the large diameter portion, the oil reservoir having at its upper end an oil supply inlet provided with a closure.

5. A center as defined in claim 4 wherein the fitting portion of the oil reservoir is formed in its inner wall with an oil groove communicating with the oil supply inlet and extending along the upper half of the large diameter portion.

6. A center as defined in claim 4 wherein the oil supply inlet has a filter.

7. A center as defined in claim 4 wherein the oil container portion of the oil reservoir is provided with an oil gauge at a specified portion of its side wall, the oil gauge comprising a cap-shaped transparent member intimately fitting in an opening in the side wall and a disk fixedly fitting in the transparent member, the disk being marked with a horizontal line extending through its center and formed with a pair of holes on the upper and lower sides of the horizontal line.

8. A center as defined in claim 4 wherein the oil container portion of the oil reservoir has a plurality of partition walls disposed in staggered arrangement to form a zigzag path of flow of the oil within the container portion.

9. A center as defined in claim 4 wherein the oil container portion of the oil reservoir has a magnet for attracting iron particles contained in the oil therein.

10. A center as defined in claim 9 wherein the magnet is hollow cylindrical, and the bottom wall of the oil container portion is formed with an oil draining bore closed with a plug, the plug having a threaded bore and a small screw screwed at its lower end in the threaded bore, the magnet being fitted around the screw, the plug being in the form of a bolt, the oil draining bore being a threaded bore.

11. A center for lathes comprising a tubular casing with its interior serving as an oil chamber, a center rod fitting in the casing and having a conical front end projecting from the casing, front bearings and a rear bearing provided between the casing and the center rod, an oil feeding screw portion positioned between the front bearings and the rear bearing and formed on the center rod, an oil reservoir provided on the casing and having a plurality of partition walls so disposed as to form a zigzag path of flow of oil, and a partition tube coextensive with the oil feeding screw portion and dividing the oil chamber into an inner rear chamber and an outer rear chamber, the partition tube being formed in its rear end with ports maintaining the inner and outer chambers in communication with each other, the oil chamber further including a front chamber positioned to the front of the inner and outer chambers and accommodating the front bearings, the front chamber communicating with the inner rear chamber, a forward oil channel maintaining the front oil chamber in communication with the oil reservoir at one end of the zigzag path, a return oil channel maintaining the outer oil chamber in communication with the oil reservoir at the other end of the zigzag path, the forward and return oil channels being formed in the front portion of the casing.

* * * * *